J. DURIEUX.
MEANS FOR EXCLUDING STONES IN GLASS DRAWING.
APPLICATION FILED MAR. 21, 1913.
1,212,031. Patented Jan. 9, 1917.
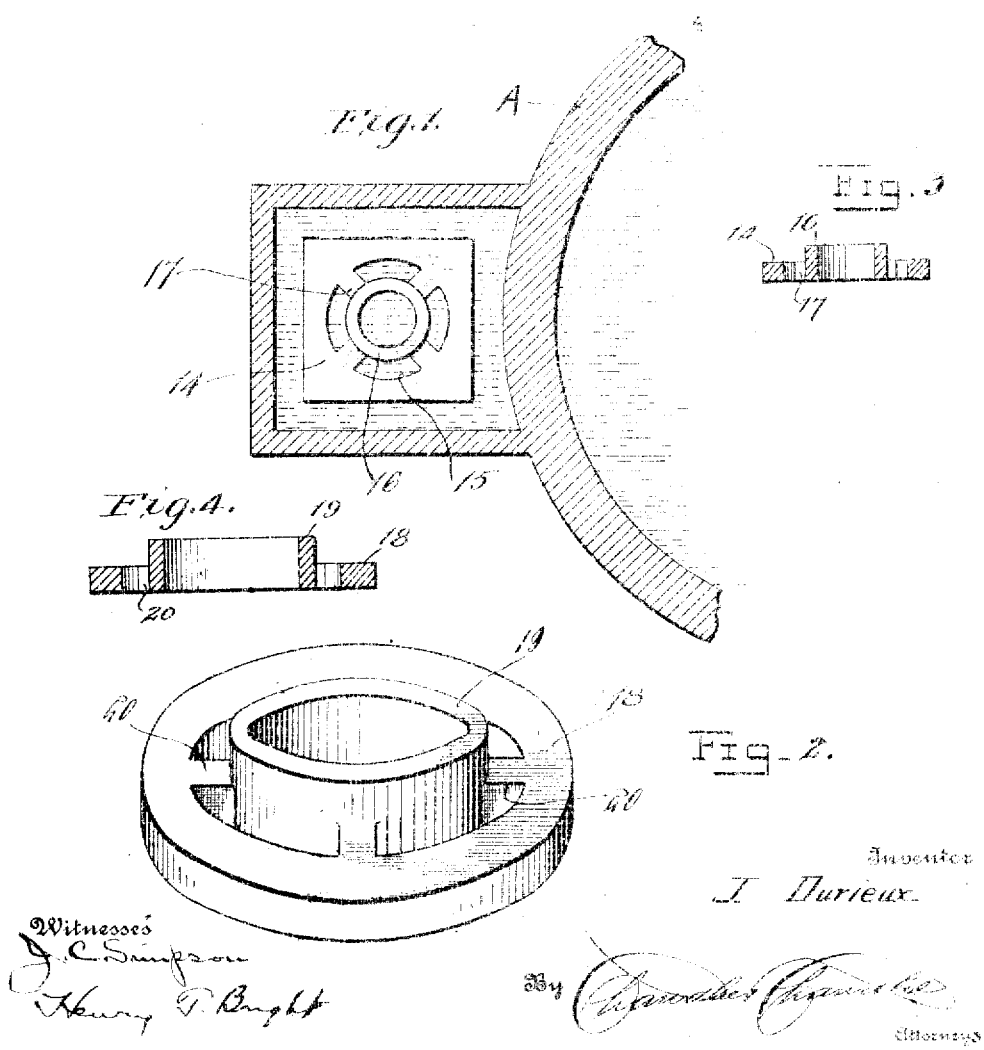

UNITED STATES PATENT OFFICE.

JOSEPH DURIEUX, OF MOUNT VERNON, OHIO.

MEANS FOR EXCLUDING STONES IN GLASS-DRAWING.

1,212,031.  Specification of Letters Patent.  Patented Jan. 9, 1917.

Application filed March 21, 1913. Serial No. 755,047.

*To all whom it may concern:*

Be it known that I, JOSEPH DURIEUX, a subject of the King of Belgium, residing at Mount Vernon, in the county of Knox, State of Ohio, have invented certain new and useful Improvements in Means for Excluding Stones in Glass-Drawing; and I do hereby declare the following to be a full, clear, and exact description of the invention, such as will enable others skilled in the art to which it appertains to make and use the same.

This invention relates to means for excluding stones in glass drawing and particularly to an improved construction of ring which is adapted to float in the molten glass and from within which the cylinder is adapted to be drawn in the usual and well known manner.

The object of the invention resides in the provision of a ring adapted to be used in connection with glass drawing apparatus and which will serve to efficiently prevent any foreign material floating on the molten glass from being carried into the wall of the cylinder as the latter is drawn.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a horizontal section of a glass melting tank looking up and showing the improved ring in place, and Fig. 2, a detail perspective view of a modified form of ring, same being in inverted position. Fig. 3 is a section taken diametrically through the device illustrated in Fig. 1 of the drawings, the representation of the furnace being omitted. Fig. 4 is a sectional view taken diametrically through the structure illustrated in Fig. 2 of the drawings, in a plane passing midway between arms 20.

Referring to the drawings A indicates the glass melting tank and B an outworking compartment which communicates with the interior of the tank A and is constantly supplied with molten glass 10 from the interior of the tank. The tank A is provided with a top 11 which is extended over the outworking compartment B as at 12 and this extension is provided with an opening 13 through which the drawing tool is adapted to pass in the operation of drawing, all in the usual and well known manner.

The improved article in one embodiment, is shown as comprising a square body 14 having a central opening 15. Disposed within the opening 15 and concentric therewith and spaced from its inner wall, is a ring 16, connected to the body 14 by a plurality of radiating arms 17. The axis of the ring 16 is greater in length than the corresponding dimension of the body 14 and one end face of the ring is in the same plane with the corresponding face of the body 14 while the other end face of the ring lies in a plane beyond that face of the body corresponding thereto. With this construction it will be apparent that when the body 14 is disposed in the molten glass 10 beneath the opening 13, no floating foreign matter exterior to the ring 16 may pass into the inclosure of the ring. The foreign matter to be avoided, as well known to those skilled in the art, floats on the surface of the molten glass.

In the second embodiment of the invention illustrated, the body 18, corresponding to the body 14 above described, is ring shape, and within it is disposed a second ring 19, the exterior diameter of which is less than the interior diameter of the ring 18. The rings being concentric, they are in spaced relation. Arms 20 radiating from the ring 19, extend to the ring 18, serving to hold the rings in fixed spaced relation. In all other respects, including the relative positions of the end faces of the two rings, the structure of the second embodiment of the invention is identical with that of the first embodiment described.

What is claimed is:

1. An article of the character described, consisting of a body portion having an opening therethrough and a tubular member disposed in the opening in spaced relation to the wall thereof and connected with the body, one end face of the tubular member lying in a plane beyond the corresponding face of the body.

2. An article of the character described, consisting of a body portion having an opening therethrough, a tubular member disposed in the opening in spaced relation to the wall thereof and connected with the body, one end face of the tubular member lying in a plane beyond the corresponding face of the body and the other end face of the tubular member lying in the same plane with the face of the body corresponding thereto.

3. An article of the character described, consisting of a flat body portion having a central circular opening, a ring disposed in said opening concentric with the latter and in spaced relation to its wall and arms connecting the ring and body portion, said ring having one end face in the same plane with the corresponding face of the body and its other end face in a plane beyond that face of the body corresponding thereto.

In testimony whereof, I affix my signature, in the presence of two witnesses.

JOSEPH DURIEUX.

Witnesses:
 MATH. DE ARBUCQUE,
 HARRY E. DUNAWAY.